(12) United States Patent
Jeong et al.

(10) Patent No.: US 9,588,700 B2
(45) Date of Patent: Mar. 7, 2017

(54) SEMICONDUCTOR DEVICE AND METHOD FOR PROGRAMMING HEALING PATTERNS ON MEMORY BLOCKS

(71) Applicant: SK hynix Inc., Gyeonggi-do (KR)

(72) Inventors: Yeon Joo Jeong, Chungcheongbuk-do (KR); Suk Kwang Park, Chungcheongbuk-do (KR); Soon Ok Seo, Seoul (KR)

(73) Assignee: SK Hynix Inc., Gyeonggi-do (KR)

( * ) Notice: Subject to any disclaimer, the term of this patent is extended or adjusted under 35 U.S.C. 154(b) by 313 days.

(21) Appl. No.: 14/327,136

(22) Filed: Jul. 9, 2014

(65) Prior Publication Data

US 2015/0254006 A1    Sep. 10, 2015

(30) Foreign Application Priority Data

Mar. 6, 2014  (KR) .................. 10-2014-0026750

(51) Int. Cl.
| | |
|---|---|
| *G06F 12/00* | (2006.01) |
| *G06F 13/00* | (2006.01) |
| *G06F 13/28* | (2006.01) |
| *G06F 3/06* | (2006.01) |
| *G06F 12/02* | (2006.01) |

(52) U.S. Cl.
CPC .......... *G06F 3/0616* (2013.01); *G06F 3/0647* (2013.01); *G06F 3/0652* (2013.01); *G06F 3/0679* (2013.01); *G06F 3/0635* (2013.01); *G06F 12/0246* (2013.01); *G06F 2212/7211* (2013.01)

(58) Field of Classification Search
CPC .... G06F 3/0616; G06F 3/0635; G06F 3/0647; G06F 3/0652; G06F 3/0679; G06F 12/0246; G06F 2212/7211
USPC ................................................. 711/103, 115
See application file for complete search history.

(56) References Cited

U.S. PATENT DOCUMENTS

| | | | | |
|---|---|---|---|---|
| 2005/0257017 A1* | 11/2005 | Yagi | ........................ | G06F 21/79 711/163 |
| 2010/0313084 A1* | 12/2010 | Hida | .................... | G06F 11/1068 714/704 |
| 2011/0044102 A1* | 2/2011 | Dong | .................. | G11C 11/5628 365/185.03 |
| 2012/0124273 A1* | 5/2012 | Goss | ..................... | G11C 16/349 711/103 |

FOREIGN PATENT DOCUMENTS

KR       100802059       2/2008

* cited by examiner

*Primary Examiner* — Tuan Thai
*Assistant Examiner* — Shane Woolwine
(74) *Attorney, Agent, or Firm* — IP & T Group LLP

(57) ABSTRACT

A semiconductor device includes a plurality of memory blocks each including a plurality of memory cells, a circuit group performing a program operation, a read operation and an erase operation on a selected memory block, among the plurality of memory blocks, and a control circuit controlling the circuit group to program the memory cells of the selected memory block in a healing pattern. The healing pattern is programmed before a subsequent program operation is performed on the selected memory block. The memory cells of the healing pattern include erased memory cells and programmed memory cells arranged alternately.

20 Claims, 6 Drawing Sheets

SEMICONDUCTOR DEVICE AND METHOD FOR PROGRAMMING HEALING PATTERNS ON MEMORY BLOCKS

CROSS-REFERENCE TO RELATED APPLICATION

The present application claims priority to Korean patent application number 10-2014-0026750, filed on Mar. 6, 2014, the entire disclosure of which is incorporated herein in its entirety by reference.

BACKGROUND

Field of Invention

Various exemplary embodiments of the present invention relate generally to a semiconductor device and a method of operating the same and, particularly, to a recovery operation of a semiconductor device.

Description of Related Art

Semiconductor devices may include a memory cell array for storing data. Memory cell arrays are composed of memory blocks and the memory blocks are composed of memory cells.

Non-volatile memory devices may retain data without loss over time based on their good data retention characteristics. However, data retention characteristics may deteriorate over time. As a result, non-volatile semiconductor devices may become unreliable over time.

In order to prevent reliability degradation caused by deterioration of data retention characteristics, a refresh operation may be performed on a memory block at predetermined time intervals. When a memory block has deteriorated beyond a predetermined level during a refresh operation, data of the deteriorated memory block may be moved to another memory block and the deteriorated memory block may be left as it is.

SUMMARY

Exemplary embodiments of the present invention are directed to a semiconductor device capable of preventing deterioration of electrical characteristics of a memory block and a method of operating the same.

A semiconductor device according to an embodiment of the present invention may include a plurality of memory blocks each including a plurality of memory cells, a circuit group suitable for performing a program operation, a read operation and an erase operation on a selected memory block, among the plurality of memory blocks, and a control circuit suitable for controlling the circuit group to program the memory cells of the selected memory block in a healing pattern, before the program operation is performed on the selected memory block, wherein the memory cells of the healing pattern include erased memory cells and programmed memory cells arranged alternately.

A method of operating a semiconductor device may include checking whether a refresh operation time of a selected memory block is less than a critical time at predetermined time intervals, checking whether an error occurs in the selected memory block based on usage of an Error Correction Code (ECC) when the refresh operation time is greater than the critical time, terminating the refresh operation when the usage of the ECC is smaller than a critical amount, and moving data from the selected memory block to another memory block when the usage of the ECC is greater than the critical amount, erasing the selected memory block and programming memory cells of the selected memory block in a healing pattern, wherein the memory cells of the healing pattern include erased memory cells and programmed memory cells arranged alternately, and resetting the refresh operation time of the selected memory block.

A method of operating a semiconductor device according to an embodiment of the present invention may include determining whether to program a selected memory block in a healing pattern in response to a command signal related to an erase operation of the selected memory block, erasing the selected memory block and program memory cells of the selected memory block in the healing pattern when it is determined to program the healing pattern as a result of determination, and maintaining a previous operating state of the selected memory block when it is determined not to program the healing pattern as the result of the determination, erasing the selected memory block in response to a command signal related to a program operation of the selected memory block, and performing the program operation on an erased memory block.

BRIEF DESCRIPTION OF THE DRAWINGS

FIG. 1 is diagram illustrating a semiconductor system according to an embodiment of the present invention;

FIG. 2 is a view illustrating a semiconductor device shown in FIG. 1;

FIG. 3 is a circuit diagram illustrating a memory block shown in FIG. 2;

FIG. 4 is a flowchart illustrating a refresh opera ion according to an embodiment of the present invention;

FIG. 5 is a view illustrating a healing pattern according to an embodiment of the present invention;

FIG. 6 is a flowchart illustrating erase and program methods according to an embodiment of the present invention; and FIG. 7 is a flowchart illustrating erase and program methods according to another embodiment of the present invention.

DETAILED DESCRIPTION

Hereinafter, various exemplary embodiments of the present invention will be described in detail with reference to the accompanying drawings. The figures are provided to enable those of ordinary skill in the art to make and use the present invention according to the exemplary embodiments of the present invention. Throughout the disclosure, reference numerals correspond directly to the like numbered parts in the various figures and embodiments of the present invention. It is also noted that in this specification, “connected/coupled” refers to one component not only directly coupling another component but also indirectly coupling another component through an intermediate component. In addition, a singular form may include a plural form, and vice versa, as long as it is not specifically mentioned in a sentence.

FIG. 1 is a view illustrating a semiconductor system according to an embodiment of the present invention.

Referring to FIG. 1, a semiconductor system 1000 may include a semiconductor device 1100 storing data DATA and a control device 1200 controlling the semiconductor device 1100. For example, the control device 1200 may output a command signal CMD and an address ADD to the semiconductor device 1100 in response to a command which is applied from an external device. The semiconductor device 1100 may perform program, read and erase operations in response to the command signal CMD and the address ADD.

In addition, the semiconductor device 1100 and the control device 1200 may exchange data DATA with each other.

Figure 1:
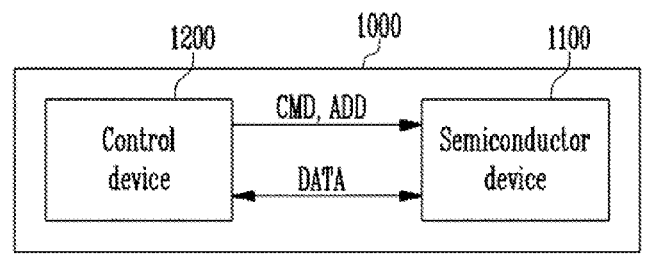
Figure 2:
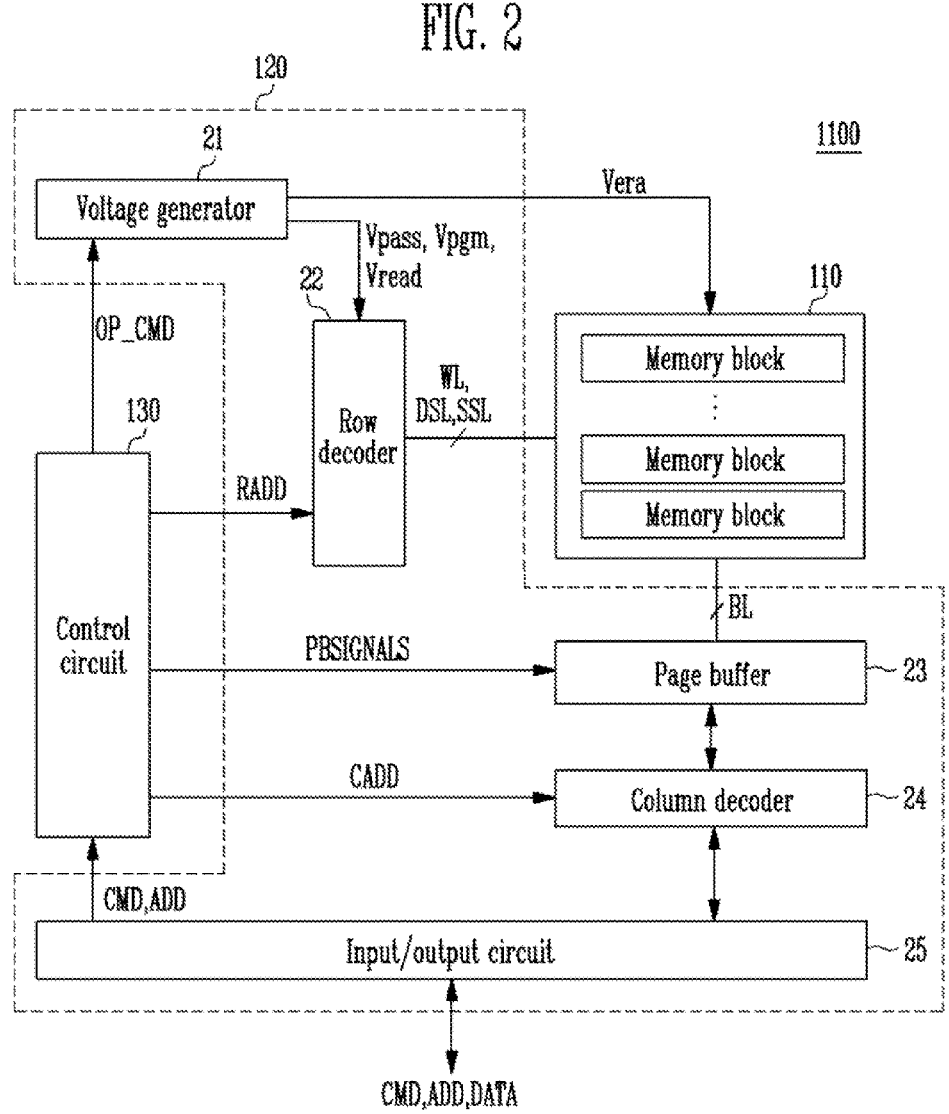

FIG. 2 is a view illustrating the semiconductor device shown in FIG. 1.

Referring to FIG. 2, the semiconductor device 1100 may include a memory cell array 110 storing data, a circuit group 120 performing program, read and erase operations of the memory cell array 110 and a control circuit 130 controlling the circuit group 120.

The memory cell array 110 may include a plurality of memory blocks, which may all have the same configuration. The memory blocks will be described in detail with reference to FIG. 3.

The circuit group 120 may include a voltage generator 21, a row decoder 22, a page buffer 23, column decoder 24 and an input/output circuit 25.

The voltage generator 21 may generate operating voltages having various levels in response to an operating command signal OP_CMD. The operating command signal OP_CMD may include a program command signal, a read command signal and an erase command signal. For example, the voltage generator 21 may generate an erase voltage Vera, a program voltage Vpgm, a read voltage Vread, a pass voltage Vpass, and other voltages having various levels. The erase voltage Vera may be transferred to a selected memory block, and the other voltages including the program voltage Vpgm, the read voltage Vread and the pass voltage Vpass may be applied to the row decoder 22.

The row decoder 22 may select one of the memory blocks included in the memory cell array 110 in response to a row address RADD and transfer the operating voltages to word lines WL, drain selection lines DSL and source selection lines SSL coupled to the selected memory block.

The page buffer 23 may be coupled to the memory blocks through bit lines BL. The page buffer 23 may exchange data with the selected memory block and temporarily store data transferred thereto during program, read and erase operations.

The column decoder 24 may exchange data with the page buffer 23 in response to the column address CADD.

The input/output circuit 25 may transfer the command signal CMD and the address ADD, which are externally transferred, to the control circuit 130. The input/output circuit may receive the data DATA from the outside (e.g. an external device) and transfer received data to the column decoder 24. The input/output circuit may receive data from the column decoder 24, and output received data as the data DATA or transfer the receive data to the control circuit 130.

The control circuit 130 may control the circuit group 120 in response to the command signal CMD and the address ADD. When receiving the command signal CMD related to an erase operation, the control circuit 130 may control the circuit group 120 to erase the selected memory block and temporarily program the selected memory block with data including a healing pattern. For example, during a refresh operation, the control circuit 130 may control the circuit group 120 to move data from the selected memory block to another memory block, erase the selected memory block and program the erased memory block with the data including the healing pattern.

In another example, when receiving a main program operation command for the memory block programmed with the data having the healing pattern, the control circuit 130 may control the circuit group 120 to erase the corresponding memory block and program the erased memory block with data of a main program operation. The healing pattern may refer to a data pattern programmed in a plurality of memory cells so that erased memory cells and programmed memory cells may be alternately arranged.

Figure 3:
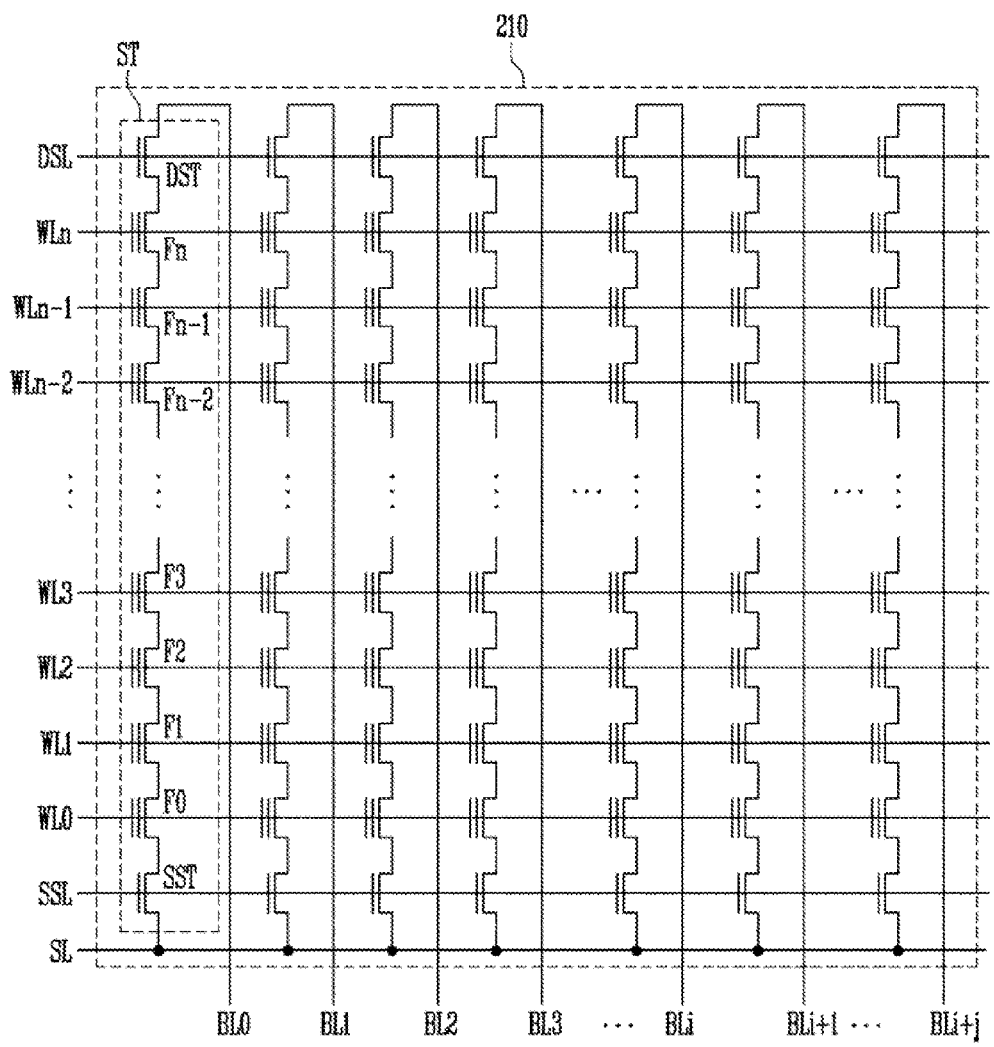

FIG. 3 is a circuit diagram illustrating the memory block shown in FIG. 2.

FIG. 3 illustrates one of the plurality of memory blocks. Since the memory blocks have the same structure, for the sake of brevity, only one of the memory blocks is illustrated in FIG. 3. Each of the memory blocks may include a plurality of strings ST. Since the strings ST have the same structure, likewise, only one of the strings ST is described below.

Each of the strings ST may include a drain selection transistor DST, memory cells F0 to Fn, and a source selection transistor SST that are coupled in series with each other. A drain of the drain selection transistor DST may be coupled to a bit line BL. A source of the source selection transistor SST may be coupled to a source line SL. Gates of drain selection transistors DST included in respective strings ST may be coupled to a drain selection line DSL. Gates of the memory cells F0 to Fn may be coupled to word lines WL0 to WLn, respectively. Gates of source selection transistors SST may be coupled to a source selection line SSL. The strings ST may be coupled to the bit lines BL0 to BLi+j, respectively. A group of memory cells coupled to the same word line may be referred to as a page PG. In addition, the memory cells may be two-dimensional memory cells arranged in parallel with a semiconductor substrate or three-dimensional memory cells arranged in a vertical direction to the semiconductor substrate.

Figure 4:
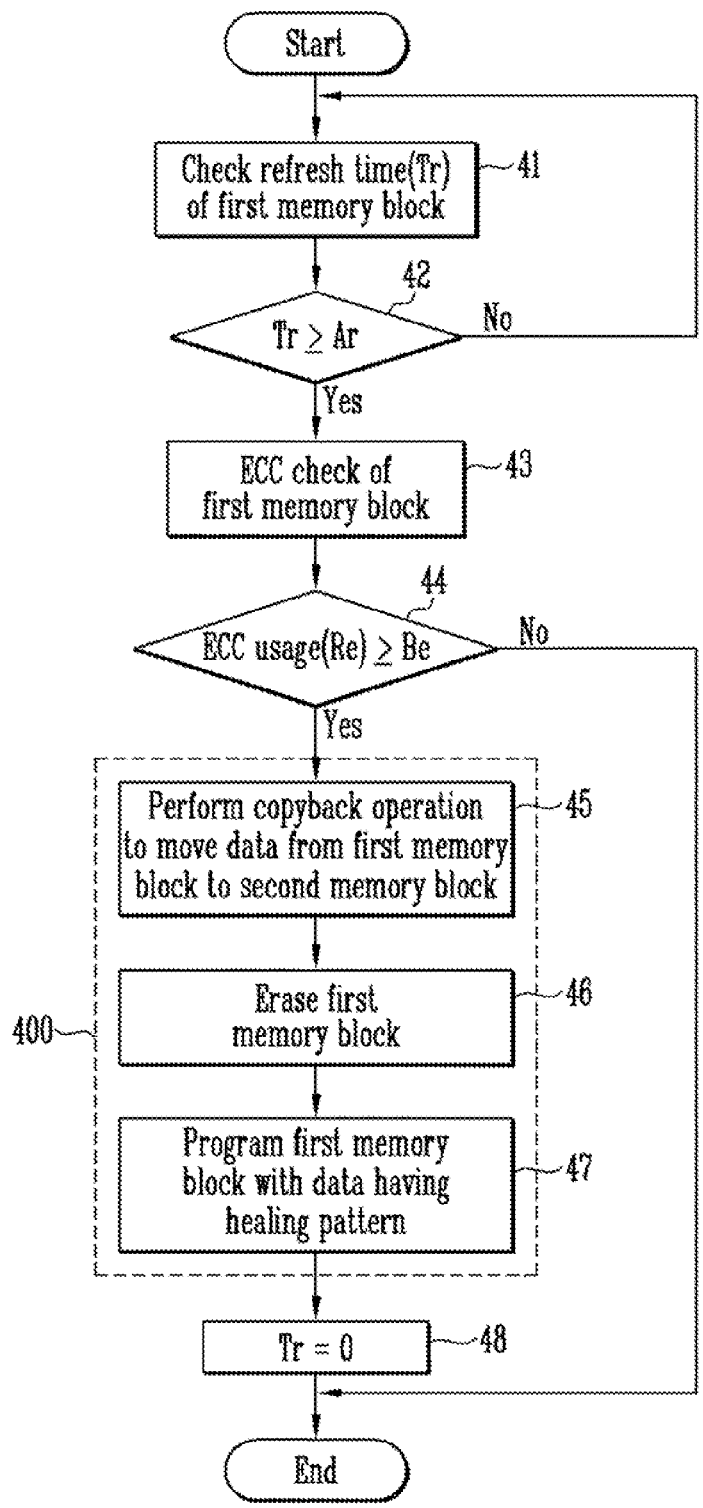

FIG. 4 is a flowchart illustrating a refresh operation according to an embodiment of the present invention.

Referring to FIG. 4, the semiconductor device may check whether a refresh operation is performed on a selected memory block at predetermined time intervals and program the selected memory block with data having a healing pattern based on a check result. For example, a first memory block may be selected and checked, and thus a detailed description is given below on the first memory block.

The refresh time Tr of the first memory block may be checked at step 41. The refresh time Tr may be counted from when the previous refresh operation is performed.

The refresh time Tr may be compared with a critical time Ar at step 42. The critical time Ar may be set to an average time for which the refresh operation is performed on memory blocks. When the checked refresh time Tr is less than the critical time Ar, the refresh time Tr of the first memory block may be checked again. The refresh time Tr may continue to be counted and increased while steps 41 and 42 are repeated.

When the checked refresh time Tr is greater than the critical time Ar, an Error Correction Code (ECC) of the first memory block may be checked at step 43. The ECC check of the first memory block may be performed as follows. Memory cells of the first memory block may be read. Among the read memory cells, memory cells in which an error occurs may be detected based on a read result. The detected memory cells may be corrected using the ECC. At step 43, ECC usage Re, i.e., the amount of the ECC used for error correction, may be checked.

When the ECC usage Re of the first memory block is higher, the first memory block may have more corrected memory cells. Therefore, the ECC usage Re and a critical amount Be may be compared with each other at step 44, and subsequent operations may be performed based on a result of comparison. The critical amount Be may be a reference amount used to determine whether to correct an error in the first memory block. The critical amount Be may vary depending on the type of the semiconductor device. For example, the critical amount Be may be set to 80%. When the ECC usage Re of the first memory block is smaller than the critical amount Be, the first memory block may be determined to be in a normal state. As a result, the refresh operation of the first memory block may be terminated. When the ECC usage Re of the first memory block is greater than the critical amount Be the first memory block may be determined to be in an abnormal state. Therefore, a replacing operation may be performed on the first memory block at step 400.

The replacing operation at step 400 of the first memory block may be performed as follows.

Data of the first memory block may be copied back to a second memory block at step 45. For example, a copyback operation may be performed in such a manner that a selected page of the first memory block may be read and the read data may be programmed into the second memory block. The copyback operation may also be performed in another manner such that all pages of the first memory block may be read, and the read data may be stored in a temporary storage unit, and the stored data may be sequentially programmed into each page of the second memory block. When the copyback operation of the first memory block is completed, an address designated to the first memory block may be mapped to the second memory block.

When the copyback operation of the first memory block and the address mapping operation are completed, the first memory block may be erased at step 46.

In order to prevent deterioration of electrical characteristics of the memory cells included in the erased first memory block, the erased first memory block may be programmed with data including a healing pattern at step 47. The healing pattern is described below with reference to FIG. 5. When the first memory block is programmed with the data including the healing pattern, the replacing operation of the first memory block in which many errors occur may be completed. Therefore, the refresh time Tr of the first memory block may be reset to '0' at step 48, and the refresh operation of the first memory block may be terminated.

Figure 5:
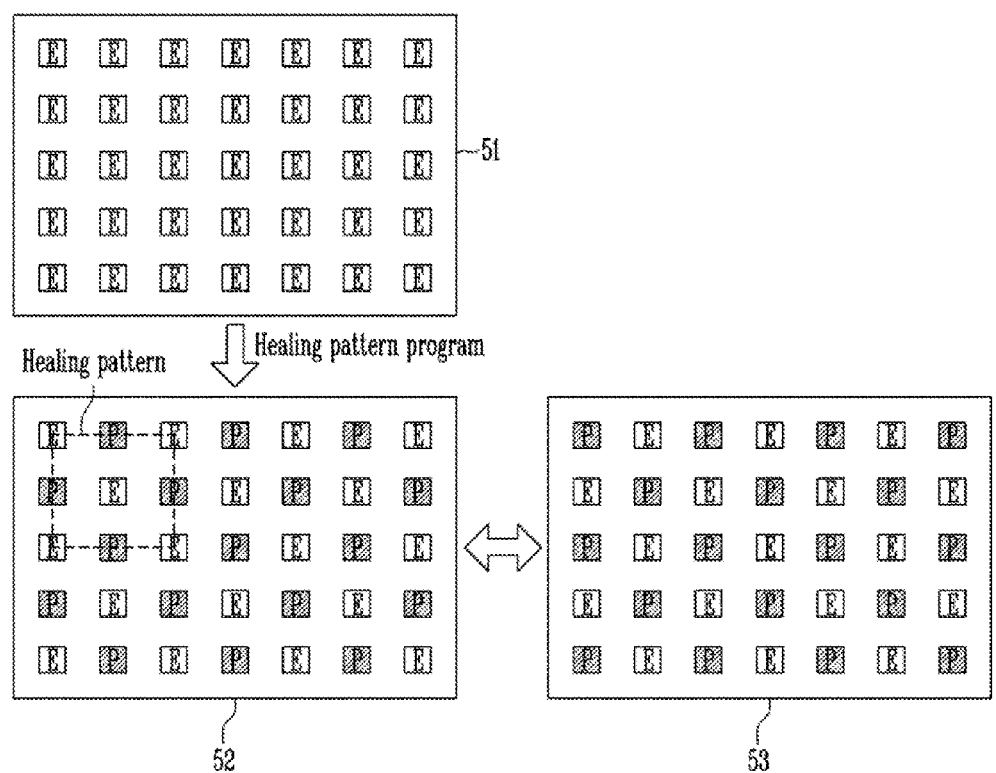

FIG. 5 is a view illustrating a healing pattern according to an embodiment of the present invention.

Referring to FIG. 5, the healing pattern described above with reference to FIG. 4 may be obtained by performing a test operation of programming data including various patterns into a memory block several times. As a result of the test operation, the healing pattern may be defined as a pattern having the least degradation in the electrical characteristics of memory cells, among the various patterns. For example, when the data including the healing pattern is programmed in memory cells, erased memory cells and programmed memory cells may be alternately arranged.

The programmed memory cells in the healing pattern may be programmed to the highest program state of a multi level cell (MLC), a triple level cell (TLC), or a quadruple level cell (QLC) which stores multi-bit data. For example, as for the multi level cell (MLC), memory cells may be programmed to an erase state, a first program state, a second program state, or a third program state. A threshold voltage may be higher in the second program state than in the first program state. A threshold voltage may be higher in the third program state than in the second program state. In the healing pattern, the programmed memory cells may be programmed to the same program state. When the memory cells are programmed to the third program state to have the highest threshold voltage, better recovery characteristics may be achieved as compared to when the memory cells are programmed to the first or second program state.

Therefore, when the first memory block is erased at step 4 in FIG. 4, the first memory block may be a memory block 51 in which all memory cells are in an erase state E as shown in FIG. 5. When the erased first memory block is programmed with the data including the healing pattern at step 47 in FIG. 4, the first memory block may be a memory block 52 programmed with the data including the healing pattern as illustrated in FIG. 5. In other words, the memory block 52 into which the data including the healing pattern is programmed may include erased memory cells E and programmed memory cells P. The programmed memory cells P may be arranged on top, bottom, left and right sides of each of the erased memory cells E. As described above, the programmed memory cells P may be programmed to the third program state.

In another example, when memory cells are triple level cells (TLC), the memory cells may be programmed into one of an erase state and first to seventh program states. Among the first to seventh program states, the first program state may refer to a program state in which a threshold voltage of a memory cell is the lowest. The threshold voltage of the memory cell may increase from the first to seventh program states. As for the trip level cells, a healing pattern may be formed by programming memory cells surrounding each erased memory cell to the seventh program state.

The healing pattern may have a pattern of alternating erased and programmed cells E and P. In order to further reduce stress of the memory cells, the pattern may be changed depending on an erase/write (E/W) cycling number. More specifically, as the E/W cycling number of the selected memory block increases, the erased cell E and the programmed cell P may change positions with each other. For example, after an erase operation is performed on the selected memory block, the erased cells E in the previous healing pattern may be the programmed cells P in the next healing pattern, and the programmed cells P in the previous healing pattern may be the erased cells E in the next healing pattern. In other words, since a healing pattern is formed by preventing the memory cells from being in the same state (i.e., an erase or program state) again, stress applied to the memory cells may be reduced.

As described above, when a memory block remains as it is erased or programmed, recovery characteristics of the memory block may be deteriorated. However, recovery characteristics of the memory block 52 on which a healing pattern program operation is performed may be improved.

Figure 6:
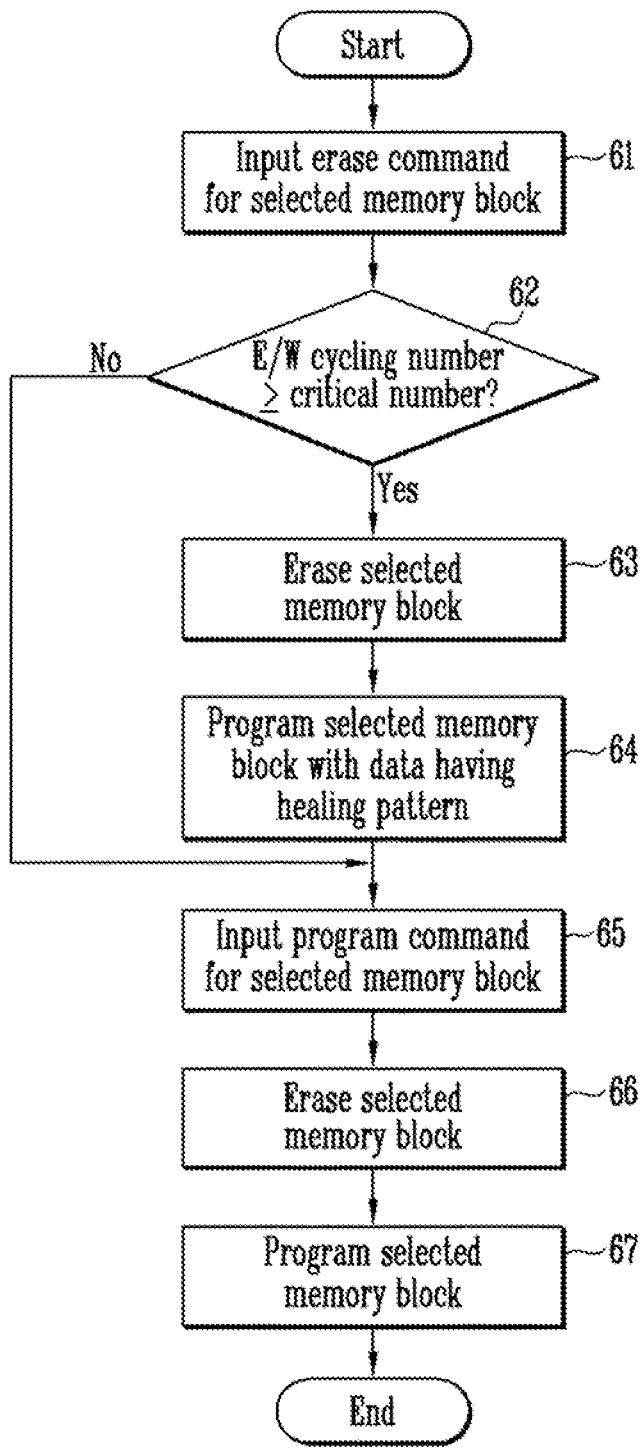

FIG. 6 is a flowchart illustrating erase and program methods according to an embodiment of the present invention.

Referring to FIG. 6, when a command signal related to an erase operation of a selected memory block is inputted, a semiconductor device may immediately erase the selected memory block, program the erased memory block with data including a healing pattern, and maintain the healing pattern until a command signal related to a program operation is inputted. The above-described erase and program methods are described below in detail.

When the command signal related to the erase operation is inputted to the semiconductor device at step 61, an E/W cycling number of the selected memory block may be checked, and the E/W cycling number of the selected memory block may be compared with a critical number at step 62. The critical number may be set in various values. For example, a certain number of E/W cycles which may stress a memory block may be set as the critical number. As a result of the comparison, when the E/W cycling number of the selected memory block is smaller than the critical number, step 65 may be performed without forming a healing pattern in the selected memory block. As the result of the comparison, when the E/W cycling number of the selected memory block is greater than the critical number, an erase operation may be performed on the selected memory block at step 63. The erase operation may be performed in an incremental step pulse erase (ISPE) scheme that gradually increases an erase voltage.

When the erase operation performed on the selected memory block is completed, the selected memory block may be temporarily programmed with the data including the healing pattern (see FIG. 5) at step 64. As a result, physical deterioration and electrical deterioration that may occur in memory cells included in the selected memory block due to a large number of E/W cycles may be effectively prevented. When the selected memory block is programmed with data including the healing pattern, recovery characteristics of the selected memory block may be improved. When the recovery characteristics of the memory block are improved, deterioration of memory cells may be prevented to improve reliability of a semiconductor device.

When the healing pattern is formed in the selected memory block, if the command signal related to the program operation of the selected memory block is inputted to the semiconductor device at step 65, the selected memory block programmed with the data including the healing pattern may be immediately erased at step 66, and the program operation of the selected memory block may be immediately performed at step 67. When the healing pattern is not formed in the selected memory block ('No' at step 62), the selected memory block may not be erased during the erase operation. Therefore, data programmed during the previous program operation may be stored in the selected memory block. Therefore, when the command signal related to the program operation of the selected memory block is inputted to the semiconductor device at step 65, the selected memory block may be erased at step 66, and a program operation may be performed on the erased selected memory block at step 67.

Figure 7:
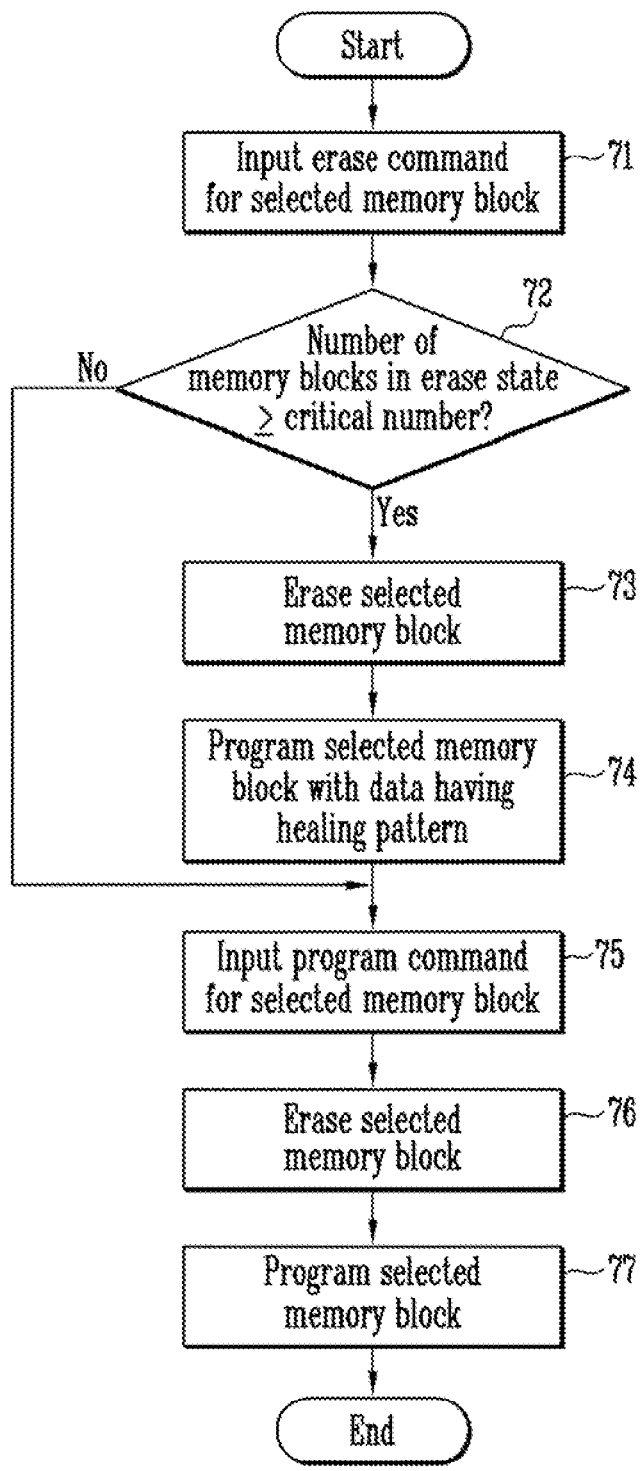

FIG. 7 is a flowchart illustrating erase and program methods according to another embodiment of the present invention.

Referring to FIG. 7, when a command signal related to an erase operation of a selected memory block is inputted, a semiconductor device may immediately erase the selected memory block, program the erased memory block with data including a healing pattern, and maintain the healing pattern until a command signal related to a program operation is inputted. The above-described erase and program methods are described below in detail.

When the command signal related to the erase operation is inputted to the semiconductor device at step 71, the number of memory blocks in an erase state, among memory blocks included in a memory cell array, may be compared with a critical number at step 72. The critical number may be set in various values. As a result of the comparison, when the number of memory blocks in an erase state is smaller than the critical number, step 75 may be performed without forming a healing pattern in the selected memory block. As the result of the comparison, when the number of memory blocks in the erase state is greater than the critical number, the erase operation may be immediately performed on the selected memory block at step 73. The erase operation may be performed in an incremental step pulse erase (ISPE) scheme that gradually increases an erase voltage.

When the erase operation of the selected memory block is completed, the selected memory block may be temporarily programmed with the data including the healing pattern (see FIG. 5) at step 74. Since erase and program operations are frequently performed when there are fewer memory blocks in an erase state, operation time may be reduced by temporarily programming the selected memory block with the data including the healing pattern. As a result, recovery characteristics of the selected memory block may be improved. When the recovery characteristics of the memory block are improved, deterioration of the memory cells may be prevented to improve the reliability of the semiconductor device.

When the healing pattern is formed in the selected memory block, if the command signal related to the program operation of the selected memory block is inputted to the semiconductor device at step 75, the selected memory block programmed with the data including the healing pattern may be immediately erased at step 76, and a program operation may be performed on the selected memory block at step 77. When the healing pattern is not formed in the selected memory block ('No' at step 72), the selected memory block may not be erased during the erase operation. Therefore, the selected memory block may store the data programmed in the previous program operation. Therefore, when the command signal related to the program operation of the selected memory block is inputted to the semiconductor device at step 75, the selected memory block may be erased at step 76, and the program operation may be performed on the selected memory block at step 77.

According to the present invention, recovery characteristics of memory blocks may be improved by programming an erased memory block with data including a healing pattern, and data retention characteristics of the memory blocks may be improved by preventing deterioration of electrical characteristics of memory cells, so that reliability of the semiconductor device may be improved.

What is claimed is:

1. A semiconductor device, comprising:
   a plurality of memory blocks each including a plurality of memory cells;
   a circuit group suitable for performing a program operation, a read operation and an erase operation on a selected memory block, among the plurality of memory blocks; and
   a control circuit suitable for controlling the circuit group to -program the memory cells of the selected memory block in a healing pattern, before a subsequent program operation is performed on the selected memory block,
   wherein the memory cells of the healing pattern include erased memory cells and programmed memory cells arranged alternately so that the programmed memory cells surround each of the erased memory cells,
   wherein the memory cells are arranged in a plurality of rows and columns within the memory blocks, and
   wherein the programmed memory cells are arranged on top, bottom, left and right sides of each of the erased memory cells.

2. The semiconductor device of claim 1, wherein the control circuit controls the circuit group to check whether a refresh operation is performed on the selected memory block at predetermined time intervals, and programs the memory cells of the selected memory block in the healing pattern based on a check result.

3. The semiconductor device of claim 2, wherein the control circuit controls the circuit group to perform the refresh operation by checking whether a refresh operation time of the selected memory block is greater than a critical time at the predetermined time intervals.

4. The semiconductor device of claim 3, wherein the control circuit controls the circuit group to check whether an error occurs in the selected memory block based on a usage of an Error Correction Code (ECC) when the refresh operation time of the selected memory block is greater than the critical time,
wherein the control circuit controls the circuit group to terminate the refresh operation when the usage of the ECC is smaller than a critical amount, and performs a replacing operation on the selected memory block when the usage of the ECC is greater than the critical amount.

5. The semiconductor device of claim 4, wherein during the replacing operation, the control circuit controls the circuit group to perform a copyback operation to move data from the selected memory block to another memory block, erases the selected memory block, and programs the memory cells of the selected memory block in the healing pattern.

6. The semiconductor device of claim 3, wherein an average time between refresh operations performed on the memory blocks is set as the critical time.

7. The semiconductor device of claim 1, wherein when an erase command signal for the selected memory block is inputted, the control circuit controls the circuit group to erase the selected memory block and program the memory cells of the selected memory block in the healing pattern.

8. The semiconductor device of claim 7, wherein when a program command signal for the selected memory block programmed in the healing pattern is inputted, the control circuit controls the circuit group to erase the selected memory block and perform the program operation on the selected memory block.

9. The semiconductor device of claim 1, wherein the programmed memory cells in the healing pattern are programmed with temporary data that corresponds to a highest threshold voltage distribution, among data programmed into the plurality of memory cells.

10. The semiconductor device of claim 1, wherein the control circuit controls the circuit group to change positions of the erased memory cells and the programmed memory cells with each other whenever the memory cells of the selected memory block is programmed in the healing pattern as an erase/write (E/W) cycling number of the selected memory block increases.

11. A method of operating a semiconductor device, the method comprising:
checking whether a refresh operation time of a selected memory block is less than a critical time at a predetermined time intervals;
checking whether an error occurs in the selected memory block based on a usage of an Error Correction Code (ECC) when the refresh operation time is greater than the critical time;
terminating the refresh operation when the usage of the ECC is smaller than a critical amount, and moving data from the selected memory block to another memory block when the usage of the ECC is greater than the critical amount;
erasing the selected memory block and programming memory cells of the selected memory block in a healing pattern, wherein the memory cells of the healing pattern include erased memory cells and programmed memory cells arranged alternately so that the programmed memory cells surround each of the erased memory cells;
wherein the memory cells are arranged in a plurality of rows and columns within the selected memory block, and wherein the programmed memory cells are arranged on top, bottom, left and right sides of each of the erased memory cells; and
resetting the refresh operation time of the selected memory block.

12. The method of claim 11, wherein an average time between refresh operations performed on memory blocks is set as the critical time.

13. The method of claim 11, wherein the critical amount is set to a reference amount used to determine whether an error occurs in the selected memory block.

14. The method of claim 11, wherein the programmed memory cells in the healing pattern are programmed into a highest program state of a multi level cell (MLC), a triple level cell (TLC), or a quadruple level cell (QLC) which stores multi-bit data.

15. The method of claim 11, wherein the erased memory cells and the programmed memory cells change positions with each other in the healing pattern whenever the memory cells of the selected memory block are programmed in the healing pattern as an erase/write (E/W) cycling number of the selected memory block increases.

16. A method of operating a semiconductor device, the method comprising:
determining whether to program a selected memory block in a healing pattern in response to a command signal related to an erase operation of the selected memory block;
erasing the selected memory block and programming memory cells of the selected memory block in the healing pattern when it is determined to program the healing pattern as a result of the determination, wherein the memory cells of the healing pattern include erased memory cells and programmed memory cells arranged alternately so that the programmed memory cells surround each of the erased memory cells,
wherein the memory cells are arranged in a plurality of rows and columns within the selected memory block, and wherein the programmed memory cells are arranged on top, bottom, left and right sides of each of the erased memory cells, and
maintaining a previous operating state of the selected memory block when it is determined not to program the healing pattern as the result of the determination;
erasing the selected memory block in response to a command signal related to a program operation of the selected memory block; and
performing the program operation on an erased memory block.

17. The method of claim 16, wherein the programmed memory cells in the healing pattern are programmed into a highest program state of a multi level cell (MLC), a triple level cell (TLC), or a quadruple level cell (QLC) which stores multi-bit data.

18. The method of claim 16, wherein the determining of whether to program the selected memory block in the healing pattern comprises:
checking an erase/write (E/W) cycling number of the selected memory block;
comparing the E/W cycling number of the selected memory block with a first critical number; and determining to program the selected memory block in the healing pattern when the E/W cycling number of the selected memory block is greater than the first critical number as a result of the comparison.

19. The method of claim 18, wherein an E/W cycling number of a memory block, which increases a stress of the memory block, is set as the first critical number.

20. The method of claim 16, wherein the determining of whether to program the selected memory block in the healing pattern comprises:
checking a number of memory blocks in an erase state, among memory blocks included in a memory cell array;
comparing the number of memory blocks in the erase state with a second critical number; and
determining to program the selected memory block in the healing pattern when the number of memory blocks in the erase state is greater than the second critical number as a result of comparison.

* * * * *